Sept. 17, 1929.  A. E. ALCHIN  1,728,778
ICE CREAM MOLD
Filed June 20 1927
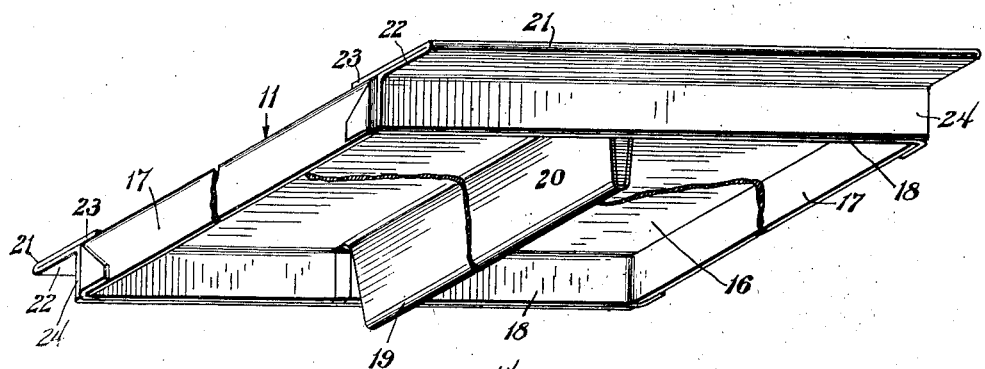
Fig.1.
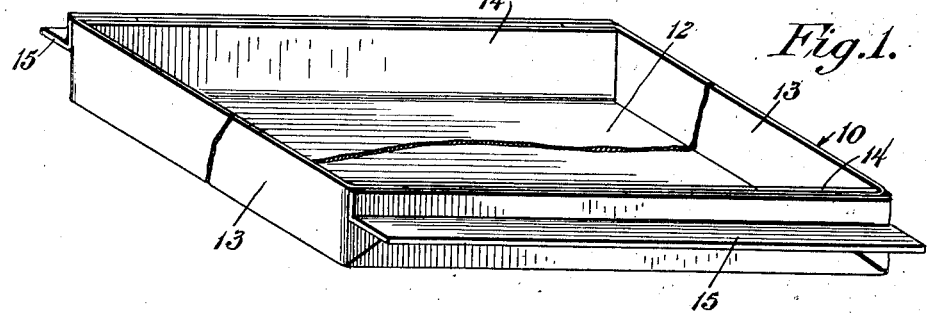
Fig.2.
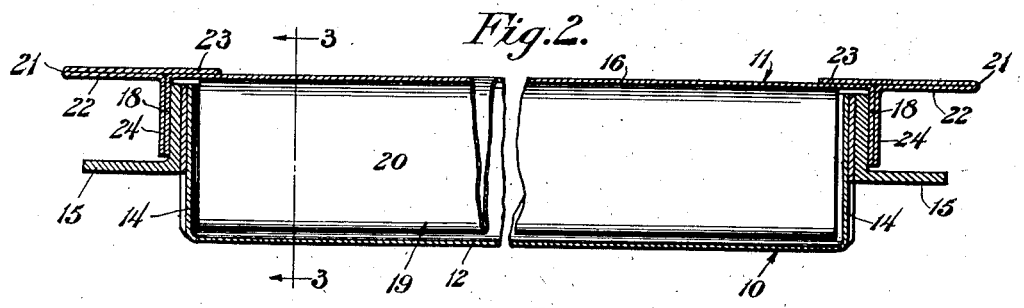
Fig.3.
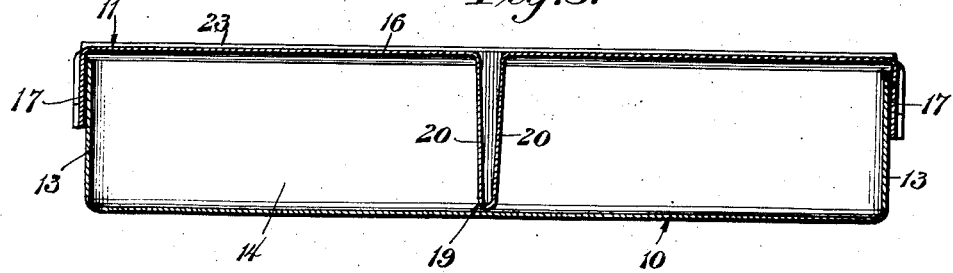
INVENTOR
A. E. Alchin,
BY
ATTORNEY.

Patented Sept. 17, 1929

1,728,778

UNITED STATES PATENT OFFICE

ALBERT E. ALCHIN, OF PERTH AMBOY, NEW JERSEY

ICE-CREAM MOLD

Application filed June 20, 1927. Serial No. 200,231.

This invention has reference to ice cream molds and aims, among other objects, to provide an improved mold for blocks of ice cream, such as are used in the manufacture of frozen confections.

In the drawings:

Fig. 1 is a displayed view of the mold;

Fig. 2 is a vertical, longitudinal, sectional view of the mold; and

Fig. 3 is a sectional view taken on the line 3—3 of Fig. 2.

In the manufacture of frozen confections such as those known as "Eskimo Pie" and the like, it is necessary that the small blocks of ice cream be of uniform size. Heretofore, it has been customary to mold the ice cream in large rectangular blocks, which are cut into slabs and then placed in the hopper of the machine.

The improved mold is adapted to produce slabs of ice cream ready to be inserted in the hopper of the machine without any cutting or further labor.

Referring particularly to the drawings, the preferred embodiment is shown as comprising a rectangular freezing pan 10 and a cover 11 therefor, to form a mold adapted to make a plurality of slabs of ice cream of the same size.

Herein the freezing pan 10 is shown as being formed of sheet metal and having a bottom 12, side walls 13 and end walls 14. Herein the depth of the pan is equal to the thickness of one slab of ice cream and the width slightly more than the combined width of two slabs.

Secured to the outer faces of the end walls 14 of the freezing pan by welding, soldering or the like are handles 15 which, in the present instance, extend the width of the pan and comprise angle irons presenting flanges extending outwardly in a horizontal direction about midway of the height of the pan.

The cover 11 also is shown as being formed of sheet metal and having a top 16, side walls 17 and end walls 18. The cover is of such size as to fit snugly over the pan and the side and end walls of the cover extend approximately down to the handles 15. The top is bent inwardly at a central point to form a partition 19, having spaced walls 20. The partition preferably extends longitudinally of the cover and midway of the side walls 17, and has the ends thereof spaced from the end walls 18 to allow the partition to be readily inserted in the pan 10 between the end walls 14 thereof. When the cover is in place, the partition extends approximately to the bottom of the pan, thereby forming two compartments of the same size. At the ends of the partition the space between the walls 20 is closed by solder or in any other manner to form a pocket for a purpose later to be described.

In the present instance only one partition has been shown but it is to be understood that two or more partitions may be employed if desired.

In order to facilitate the removal of the cover, a handle 21 has been provided at each end thereof. In the present instance each handle is shown as being formed of a strip of sheet metal of a length equal to the width of the cover which is bent longitudinally to provide a double thickness 22, an attaching flange 23, which is secured to the top 16, of the cover, and a depending flange 24 which is secured to the end wall 18 of the cover. The handles 21 extend outwardly from the cover in a horizontal direction beyond the handles 15 and spaced therefrom in order that they may be readily grasped when the cover is to be removed.

The cream is placed in the freezing pan 10 while it is soft and when the cover 11 is put in place the partition 19 is forced into the cream, separating it into two parts. After the cream has hardened, it is necessary to dip the mold in water to remove the ice cream. In doing this, some of the water enters the pocket formed between the side walls 20 of the partition 19 and loosens the ice cream from the partition. The side walls 20 of the partition are shown as diverging upwardly to permit the partition to be withdrawn easily from the ice cream. After the cover has been lifted, the slabs of ice cream may be removed from the pan by inverting the same when they are ready to be placed in the hopper of the machine.

From the foregoing description it will be apparent that an improved mold has been provided which may be manufactured very cheaply and which accomplishes the desired results in an easy yet efficient manner.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:

1. An ice cream mold comprising a substantially rectangular receptacle; a sheet metal cover for closing the receptacle; and a hollow partition open at the top only formed longitudinally on the cover and extending to the bottom of the receptacle when the cover is in place, said partition terminating short of the ends of the cover and having closed ends.

2. An ice cream mold comprising an oblong receptacle having side walls and end walls; handles secured to the end walls of said receptacle; a sheet metal cover for closing the receptacle; a hollow partition formed on said cover and having closed ends terminating short of the opposite edges of the cover; and handles secured to the ends of said cover and arranged immediately above the handles on the receptacles.

3. A mold comprising an oblong receptacle having side walls and end walls; handles secured to the end walls of said receptacle; and extending the width thereof; a cover having side walls and end walls adapted to fit over the walls of the receptacle; a partition formed on said cover and having a pocket formed therein, said partition extending to the bottom of the receptacle; and handles secured to the end walls of the cover and extending the width thereof.

4. A mold comprising an oblong receptacle having side walls and end walls; angle irons each having one of their flanges secured to one of the end walls of the receptacle and having their other flanges extending outwardly from the receptacle midway of the height thereof; a cover having side walls and end walls; a hollow partition formed on the cover, said partition extending downwardly to the bottom of the receptacle; and handles secured to the top and end walls of the cover, said handles being extended outwardly from the cover and spaced from the angle irons.

5. A mold comprising an elongated receptacle; having side walls and end walls; angle irons of a length equal to the width of the receptacle and each having one of their flanges secured to one of the end walls of the receptacle and having their other flanges extending outwardly from the receptacle midway of the height thereof; a cover having side walls and end walls; a hollow partition formed on the cover, said partition extending downwardly to the bottom of the receptacle; and handles for the cover each comprising a metal strip of a length equal to the width of the cover, and bent longitudinally to provide a handle portion extending outwardly beyond the angle irons and having flanges for attachment to the top of the cover and depending flanges for attachment to the end walls thereof.

In testimony that I claim the foregoing as my own, I have hereto affixed my signature.

ALBERT E. ALCHIN.